(12) United States Patent
Shelp et al.

(10) Patent No.: US 6,176,997 B1
(45) Date of Patent: Jan. 23, 2001

(54) APPARATUS AND METHOD FOR COPPER EXTRACTION BY IN-SITU ELECTROLYSIS IN HEAP-LEACHING OF ORES

(75) Inventors: Gene Sidney Shelp, Guelph; Ward Chesworth, Eden Mills, both of (CA)

(73) Assignee: Enpar Technologies Inc., Guelph (CA)

(*) Notice: Under 35 U.S.C. 154(b), the term of this patent shall be extended for 0 days.

(21) Appl. No.: 09/214,464

(22) PCT Filed: Jun. 19, 1997

(86) PCT No.: PCT/CA97/00427

§ 371 Date: Dec. 16, 1998

§ 102(e) Date: Dec. 16, 1998

(87) PCT Pub. No.: WO97/49836

(30) Foreign Application Priority Data

Jun. 21, 1996 (GB) .................................................. 9613094

(51) Int. Cl.[7] .......................... C25B 15/02; C25B 15/00; C25C 1/06; C25C 1/12; C25C 7/00
(52) U.S. Cl. ........................ 205/337; 205/560; 205/687; 205/587; 205/574; 204/229.8; 204/232; 204/237; 204/252
(58) Field of Search .............................. 204/228.6, 230.2, 204/230.5, 237, 233, 252; 205/335, 337, 687

(56) References Cited

U.S. PATENT DOCUMENTS

| | | | |
|---|---|---|---|
| 3,737,381 | * 6/1973 | White et al. | 204/233 X |
| 3,894,929 | * 7/1975 | Drinkard, Jr. et al. | 204/233 X |
| 4,068,677 | * 1/1978 | Desteur et al. | 204/228.6 X |
| 4,173,519 | * 11/1979 | Parker et al. | 204/233 X |
| 4,512,853 | * 4/1985 | Wright et al. | 205/337 |
| 5,833,830 | * 11/1998 | Dominguez et al. | 205/335 X |

* cited by examiner

*Primary Examiner*—Donald R. Valentine
(74) *Attorney, Agent, or Firm*—Anthony Asquith & Co.

(57) ABSTRACT

Copper is extracted from a heap of low-grade ore by transforming the heap into an electrolytic cell, and imposing a voltage thereon. Anodic conditions of redox and pH cause the sulphide to break down, and the copper to pass into solution. The copper can be recovered elsewhere if the electrolyte is drawn off, or in-situ if allowed to plate onto the cathode. Electrodes are formed as grids of conductors, or as layers of e.g. graphite.

22 Claims, 6 Drawing Sheets

System Cu-S-O-H

FIG.1

System Cu-Fe-S-O-H

ID AND METHOD FOR COPPER
EXTRACTION BY IN-SITU ELECTROLYSIS
IN HEAP-LEACHING OF ORES

Heap-leaching, or dump-leaching, is a conventional technique for extracting metals such as copper from low-grade ore bodies. The metal is recovered from its oxide and/or sulphide ores in two stages. The first stage involves creating conditions in which the metal passes into solution. This is done by leaching the heap or dump of the ore with an appropriate solution, for example of weak sulphuric acid. Secondly, the metal is extracted from the pregnant leach liquor or lixiviant. This second stage, i.e the extraction of the dissolved metal from the lixiviant, can be done by chemical precipitation, or by electro-winning, for example.

The first stage of the process demands the provision of an aqueous environment in which the sulphide or other mineral in the ore breaks down to produce metallic (and other) species in solution. In the conventional heap-leaching techniques, an appropriate aqueous environment as been achieved by adding oxygen (atmospheric) to the lixiviant, together with acids, alkalies, or complexants, singly or in combinations. It is known that micro-organisms can play a significant role in producing the required environment.

The conventional second stage of the heap-leaching process receives the pregnant liquor from the first stage and extracts from it the required metal by chemical manipulation or by electro-winning. When chemical manipulations are performed, they are generally performed in a custom-built pond or container. When the metal is extracted from solution by electrolytic action, again such processing is generally performed in a custom-built pond or container.

It is emphasised that the electrolysis aspects of electro-winning the metal from solution are carried out upon the liquor into which the copper has already been caused to dissolve. Conventionally, the electrolysis takes place after the liquor has been withdrawn from the heap.

Typically, the pregnant leach liquor might contain up to 10 grams of copper per liter. Iron will also commonly be present in significant amounts as both ferrous and ferric ions. Other metals such as zinc, lead, cobalt, chromium, nickel, silver, gold and others, may also be present.

THE PRIOR ART

A general process for leaching of copper ores is described in U.S. Pat. No. 2,563,623 which illustrates a copper dissolution process as well as a precipitation process. Electro-winning of metal from solution is described in U.S. Pat. No. 3,103,474.

Summary Of The Prior Art Teachings:
the use of chemical and micro-biological manipulations in the first stage, to produce an aqueous environment conducive to the breakdown of e.g sulphide mineral ores;
the use of electrolysis in the second stage, i.e in the extraction of metal from the lixiviant drawn from the heap or dump.

The Prior Art Does Not Teach:
the use of electrolysis in the first stage, i.e the use of electrolysis actually in the heap, for the purpose of creating an aqueous environment conducive to the breakdown of sulphide mineral ores;
the use of electrolysis in the extraction of metal from lixiviant, in situ within the heap or dump;
the conversion in situ of the heap or dump of sulphide mineral ore itself into an electrochemical cell to accomplish these purposes.

SUMMARY OF THE INVENTION

The invention transforms the heap or dump of low-grade metal ore, being sulphides or the like, into an electrolytic cell. That is to say, the heap is caused to adopt an anode-cathode configuration by the imposition of an outside voltage. In practice, electrolyte is added to the heap in such a manner that the heap, if not totally saturated with electrolyte, is at least in a condition of overall electrolytic continuity.

The nature of the cell, as engineered, is such that at the anode of the cell the Eh (redox) voltage of the electrolyte is high enough, and the pH of the electrolyte is low enough, that the metal sulphide or other mineral breaks down, and the metal dissolves and passes into solution in the electrolyte.

Typically, in the case of copper, and in the case where iron is also present (iron is often present with copper), the designer might seek to engineer conditions at the anode in which, for instance, the Eh is +0.5 volts or more, and the pH is 2 or less. It depends, of course, on what else is present in the heap, but those levels will normally be enough to cause the copper to dissolve, and to pass into the electrolyte (as $Cu^{++}$ ions).

Generally, if the existing conditions of Eh and pH are not enough, because of other minerals that might be present, the designer of the system can cause the copper and other metals to pass into solution by adequately lowering the pH and raising the Eh; however, the prudent designer will seek to achieve breakdown, and dissolution of the metal, if possible, without going to the limits of acidity and voltage.

At the cathode, the electrolytic conditions are characterised by an increased pH, and a lowered Eh. As the metal cations approach the cathode, they will start to come out of solution, and indeed, if the cations reach the cathode, the cathode will become plated with the metal. But in the first stage of the heap extraction process, however, the desired effect is for the metal to pass into solution in the electrolyte (lixiviant), and to remain in solution therein until the time comes for the metal to be extracted from the liquid. As mentioned, the conventional manner of extracting the metal from the lixiviant might involve plating the cathode, or one of the electro-winning techniques, which involve removing the metal-laden lixiviant before it reaches the cathode.

Preferably, the high-Eh/low-pH conditions at the anode should obtain over a large portion of the whole heap. That is to say: the ideal would be for all the heap to be one large anode, whereby over the whole heap the ore would be breaking down, and the metal from the ore would be passing into solution. While it is rarely possible to ensure that the whole heap behaves like an anode, it is recognised that it is however possible to extend the anodic conditions into a substantial portion of the heap, i.e well beyond the immediate localised vicinity of the actual electrode.

The designer should preferably provide means for extending and augmenting the anodic conditions over large areas of the heap.

First, preferably, the designer should arrange that the anode electrode is itself large, whereby the anode occupies a large portion of the volume of the heap. This can be done by connecting several grids, placed at different levels in the heap, to the anode voltage, as will be described.

Second, preferably, the designer should arrange that the electrolyte has a physical movement or velocity that carries the electrolyte through the heap, in the direction away from the anode. The movement causes the anodic conditions to be extended away from the anode. One source of motion can be gravity, whereby the electrolyte falls down the heap from top to bottom. In this case, the anode should be at the top and the cathode at the bottom, so the electrolyte flows from anode to cathode. Alternatively, in a case where the electrolyte is pumped, the electrodes might be horizontally separated, for instance.

It is preferable also that the anode is located at a place in the heap where the heap is exposed to the atmosphere. The stronger the direct oxygen influence in the heap, and in the electrolyte, the naturally higher the Eh voltage. For this reason also, the designer should locate the anode at the top of the heap.

The designer, when providing for physical movement of the electrolyte through the heap, in order to ensure the electrolytic cell will function properly, must of course arrange that the disposition and extent of the moving electrolyte within the heap is such that electrolytic continuity is maintained between the anode and the cathode. But it is not necessary that the moving electrolyte containing the dissolved copper should actually reach the cathode—nor even that it should have a velocity directed towards the cathode, although usually that will be convenient.

If the configuration of the cell is such that the cathode is physically accessible, the metal can be allowed to plate the cathode, given that the metal can then be removed later from the cathode. However, often the cathode is buried at the base of the heap, and is inaccessible, in which case the electrolyte containing the metal in solution should not be allowed to reach the cathode. The metal should be recovered from the electrolyte before the electrolyte reaches the cathode.

The copper-laden liquor can be drawn off from the electrolyte at a convenient point. Preferably, draw-off of the liquor should be taken at a point where there is little or no more ore for the electrolyte to pass through. That is to say: the designer should provide that as much as possible of the heap should be under anodic conditions, and should provide that the electrolyte (lixiviant) should be drawn off only after the electrolyte has passed right through the anodic portion of the heap. Generally, that being so, the draw-off point for the liquor will turn out to be close to the cathode, but that is not essential.

By imposing a velocity on the liquid electrolyte away from the anode, the anodic conditions in the electrolyte can be extended into the heap, far away from the actual anode electrode.

(It might be pointed out that if the electrolyte were made to flow away from the cathode, by contrast, it would be the cathode conditions that would be extended into the heap. Such velocity of the electrolyte, i.e away from the cathode, is contra-indicated in the present case; it is the anode conditions that cause the sulphide to break down, and the copper to go into solution. Copper metal has a tendency to come out of solution at or near the cathode, not to dissolve.)

One effect of the movement of the electrolyte, given that the electrolyte is flowing away from the anode, is that the anions that appear at the anode might tend to be hydroxyl ions from electrolysis of the water in the electrolyte, rather than, for example, sulphate ions from the cathode. Sulphate would have to diffuse all the way, against the velocity of the electrolyte, from the cathode, and the anode can take these other, more easily available, anions.

As will be described, a preferred form of the invention provides the anode on top of the heap, in the zone of the heap that is exposed directly to oxygen in the atmosphere; provides the cathode at the bottom of the heap, in a region where the material of the heap is saturated and submerged; provides for the lixiviant to be sprinkled on top of the heap, whereby the lixiviant percolates down through the heap (the residence time of the lixiviant in the heap being, typically, a few days), and whereby the lixiviant provides electrolytic continuity between the anode and the cathode. Preferably also, the anode occupies physically a large portion of the heap. By this means, metal can be dissolved out of the whole heap of ore; or, if not the whole heap, at least over much more of the whole heap than just the immediate area near the anode electrode.

In this set-up, metal is extracted from the heap at a rate that compares very favourably with conventional heap-leaching, and in fact the rate of extraction can usually be increased several-fold by transforming the heap into an electrolytic cell in the manner as described. It is important that the metal extraction rate be achieved with a minimum of acid, as to both quantity and strength thereof, and again this aspect is favoured by the electrolytic techniques as described.

It may be noted that by electrolysing the water in the electrolyte, the acidity concentration of the electrolyte at the anode is increased, or at least is inhibited from decreasing.

In heap leaching, an acid/base or ion-exchange reaction causes the ore to break down, and conventionally the required acid environment is maintained by adding acids and complexants to the lixiviant. By setting up the heap as an electrolytic cell, the redox reactions are promoted; as a result, the pH and Eh conditions are created at the anode under which the sulphide will break down, and the desired metal will pass into solution.

It should be regarded that the sulphide minerals are not part of the cell in an electrochemical sense. Rather, in the system as described herein, it should be regarded that the lixiviant liquid has been engineered as the electrolyte of the cell, as well as the lixiviant which breaks down the sulphide. Thus, the cell anode creates the conditions in the liquid, as an electrolyte, of pH and Eh under which the breakdown reactions occur in the liquid, as a lixiviant.

The cathodic reactions, in which the metals tend to precipitate, can be engineered to proceed to completion if the precipitated metal would be accessible; or the designer can arrange for the lixiviant to be drawn off, for later extraction of the metal, if the cathode is not physically accessible.

In the second stage of the extraction system, the metal can be extracted from the lixiviant either by arranging for the metal to plate the cathode, or by drawing off the lixiviant from the heap, and then extracting the metal therefrom by suitable techniques. In many cases, when the metal has been extracted from the lixiviant, the lixiviant can be recycled through the heap once again. Of course, sometimes, the lixiviant, in passing through the heap just once, will pick up such other substances that it cannot be re-used.

In determining the anode conditions, the designer should bear the following points in mind.

When the Eh of a solution is higher than the electrode potential of, for example, a particular sulphide, the solution is said to be oxidising with respect to that sulphide. If the sulphide is connected via an external circuit to a substance with greater electronegativity, and both are immersed in the solution, a current will flow from the more electronegative substance (the cathode) to the sulphide (the anode). The current is sustained by the oxidation of the sulphide which gives up electrons, and releases positively charged ions into the solution. The electrons flow via the external circuit to the cathode where a reducing reaction takes place. The reducing reaction adds electrons from the cathode to ions in solution such that the oxidation at the anode is balanced.

As described, the system can constitute a galvanic cell. It is recognised that the weathering of sulphide veins, in nature, is a process that leads to the enrichment of the upper, oxygenated part of a given vein in the metals contained in the sulphides of the vein itself. The natural process is called supergene enrichment. However, the process is far too slow, in nature, to serve as an economical substitute for conventional means of heap or dump leaching.

But when a power source is added to the external circuit, the rate at which electrons are transferred along the outside circuit increases, whereby the rate of oxidation at the anode increases, together with the balancing rate of reduction at the cathode. With a power source added the system becomes an electrolytic cell. As such, it does not rely upon the variation of oxygen activity by proximity to the atmosphere, as a galvanic cell would—and as conventional heap leaching does. Rather, the powered electrolytic cell enables the favourable conditions of high-Eh/low-pH to be accomplished simply by the imposition of an electromotive force. This is not taught by the prior art, nor by reactions in nature.

The oxidation reaction at the anode of an electrolytic cell is applicable to the first stage of a heap or dump leach. The oxidation reaction results in the breakdown of sulphide ore to produce metal ions in solution. The reduction at the cathode of an electrolytic cell can be used in the second stage of a heap or dump leach, if the cathode is accessible, since it results in the recovery of metal from solution.

In the case of copper, and using the mineral covellite as an example, a typical anode reaction might be:

$$CuS + 4H_2O = Cu^{++} + SO_4^{--} + 8H^{++} + 8e^-$$

with the copper going into solution as cupric ion.

A balancing cathode reaction might be:

$$Cu^{++} + 2e^- = Cu$$

with the cupric ion in solution plating out as copper at the cathode.

Figure 1:
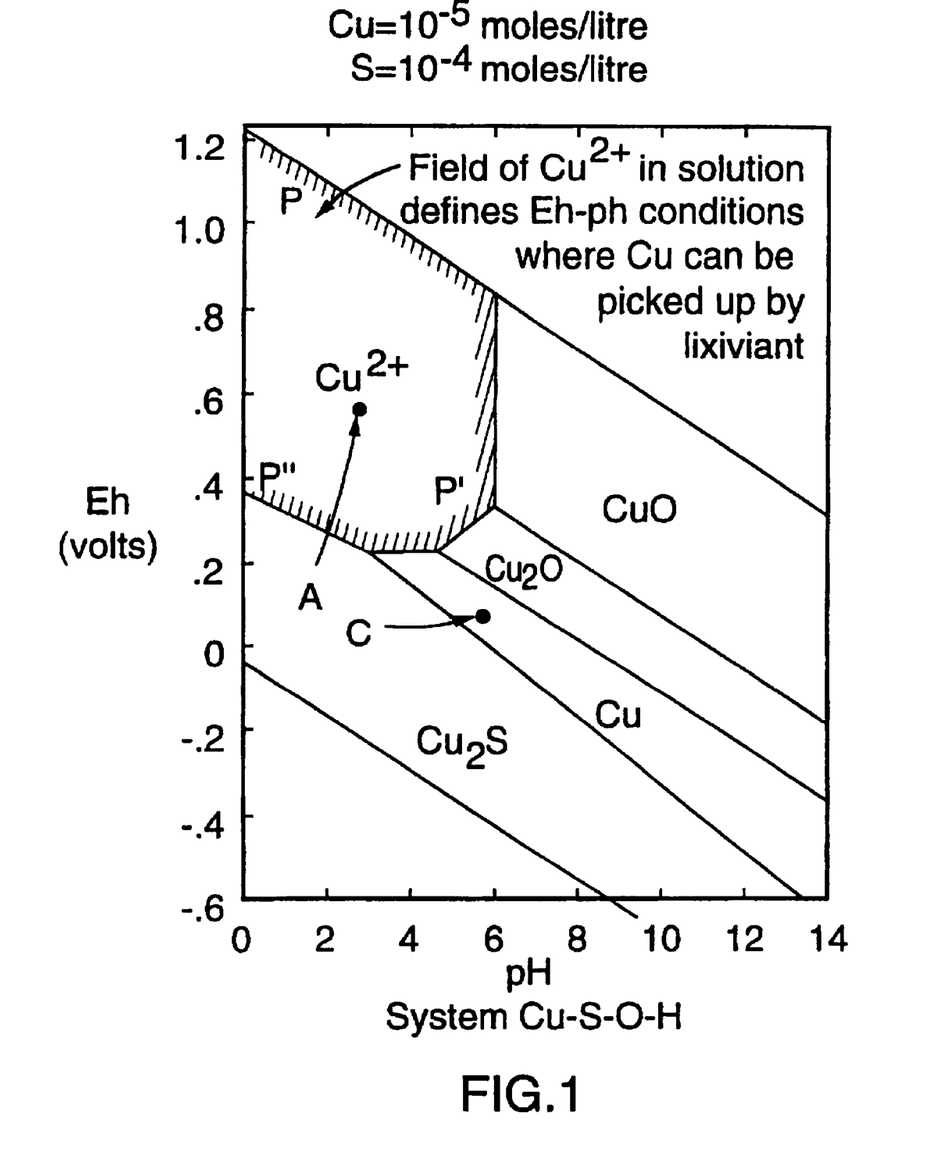
FIG. 1 (as mentioned above) is a Pourbaix or Eh/pH phase diagram for Cu—S—O—H, the diagram as shown being a simplification of the conventional text-book diagram, in which the conditions that favour the dissolution of copper are highlighted.

The Pourbaix (or Eh-pH) diagram (FIG. 1) provides a concise way of considering the above. In FIG. 1, the predominance fields of the most relevant solid and aqueous species are shown. Where conditions in a heap or dump are maintained near point A (anode), the sulphide will break down and will yield $Cu^{++}$ into the lixiviant. However, if the prevailing Eh-pH conditions were to be more towards the point C (cathode), $Cu^{++}$ will be removed from solution as copper metal.

The above example is taken as the simplest case. More complicated possibilities exist, though the principle remains the same.

For example, complications arise if iron (sulphide) is present in the system. This may be illustrated by replacing covellite in the previous example with chalcopyrite. In this case the anode reaction becomes more like:

$$CuFeS_2 + 8H_2O = Cu^{++} + Fe^{++} + 2SO_4^{--} + 16H^{++} + 16e^-$$

Again, more complicated reactions may be written, but the principle remains the same.

The complications arising from the presence of iron in solution include the following. First, the designer must ensure very low pH, because if the solution becomes insufficiently acidic an iron hydroxide may precipitate, which has a tendency to remove copper from solution. Since this also involves the conversion of iron from ferrous to ferric state, power is wasted that would otherwise be going into solubilising the copper. Another drawback is that iron may precipitate at the cathode, to the exclusion of copper.

Figure 1A:
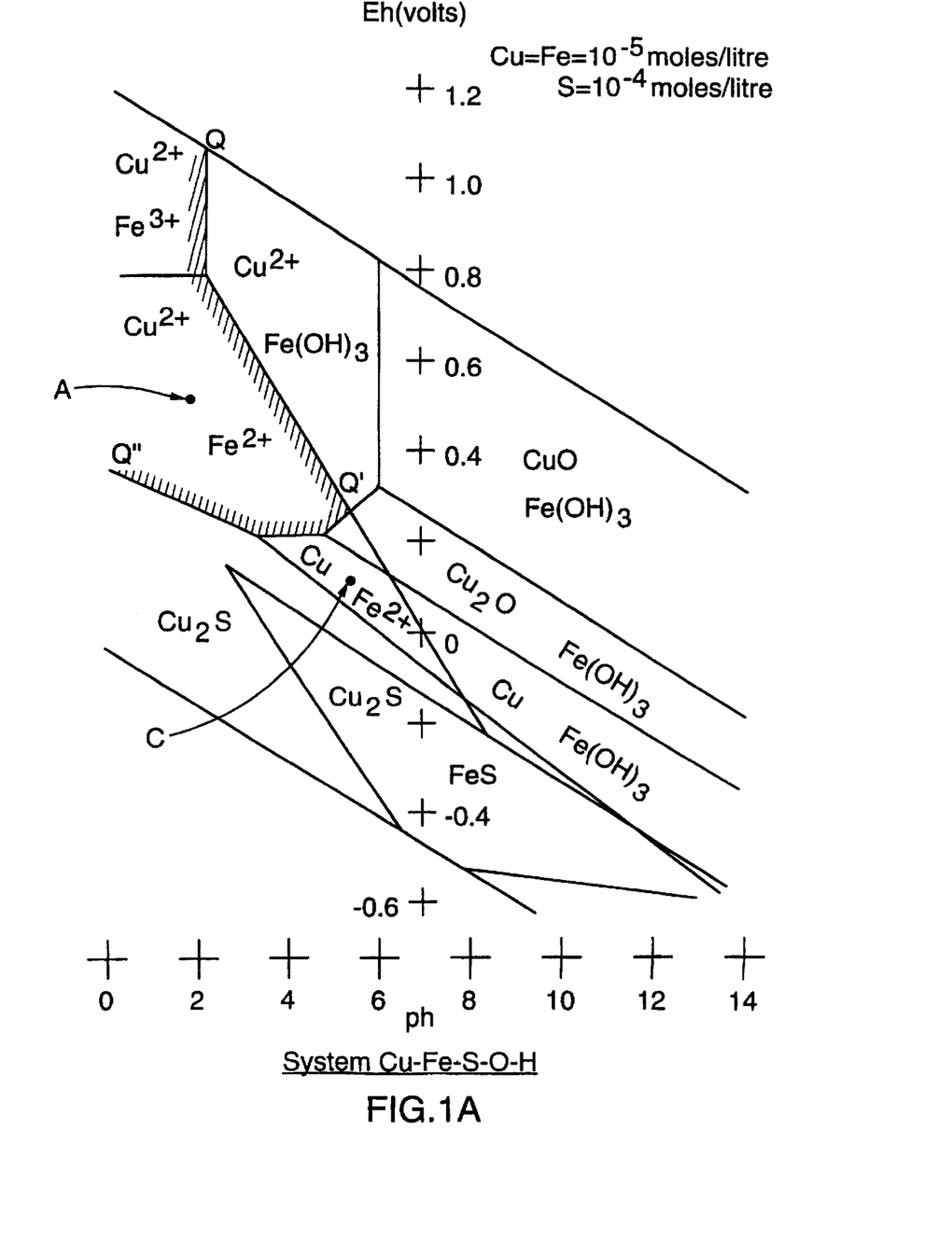
FIG. 1a (as mentioned above) is a Pourbaix or Eh/pH phase diagram for Cu—Fe—S—O—H, the diagram as shown again being a simplification of the conventional text-book diagram, and again in which the (now less extensive) conditions that favour the dissolution of copper are highlighted.

The Pourbaix diagram in the case when iron is present is shown in FIG. 1a. Thus, FIG. 1a is the diagram for Cu—Fe—S—O—H. Where conditions in a heap or dump are maintained near condition A, the sulphide will break down and will yield $Cu^{++}$ and $Fe^{++}$ into the lixiviant. However, if the pH were to increase, an iron hydroxide will precipitate, and the precipitant will tend to remove the $Cu^{++}$ from solution (by adsorption). The designer preferably should see to it, if iron is indeed present, that the conditions that allow the hydroxide phase are avoided.

If conditions move to the vicinity of C (as they do at the cathode), $Cu^{++}$ will be removed from solution as copper metal. It should be noted that if the electro-activity of $H_2S$ were allowed to attain a high value, the $Cu^{++}$ would come out as a copper sulphide—which of course would be a direct waste of the heap leaching process.

Preferably, the designer should supply electrical energy to the electrolytic cell so as to create in the electrolyte in the vicinity of the anode an Eh voltage in the region of +0.5 volts or higher, and a pH of 2 or less, under which conditions copper will tend to pass from (solid) sulphide into solution, in the vicinity of the anode. The anode conditions above and to the left of the line P-P'-P" (i.e the shaded area) in FIG. 1 are the most favourable for the advantageous breakdown of sulphide and the passing of copper into solution. In FIG. 1a, because of the need to avoid the danger from the formation of the iron hydroxides, the range of acceptable anode conditions is reduced, as shown by the line Q-Q'-Q" in FIG. 1a.

As mentioned, the conditions at the anode can be caused to extend well away from the actual anode electrode, into the body of the heap. To extract the dissolved metal from the electrolyte, the designer can arrange for the metal to plate the cathode, or he can arrange for the electrolyte to be drawn off before it reaches the cathode, whereby the metal can be recovered from the electrolyte, away from the heap. When the metal is extracted from the electrolyte via plating the cathode, it may be noted that turning the heap into an electrolytic cell accomplishes both the dissolving of the metal out of the ore (at the anode), and the precipitation of the metal (at the cathode), in a single in-situ structure.

The technology as described herein can also be applied to enhance the recovery of nickel, zinc, gold, silver, molybdenum, and the like, from low-grade ores, especially where the metal of interest is associated with sulphide and other electrically-conductive minerals. The respective Pourbaix diagrams for those materials can be used to determine what redox and pH conditions are required in the various cases.

DESCRIPTION OF THE DRAWINGS

The invention will now be further described with reference to the accompanying drawings, in which.

Figure 2:
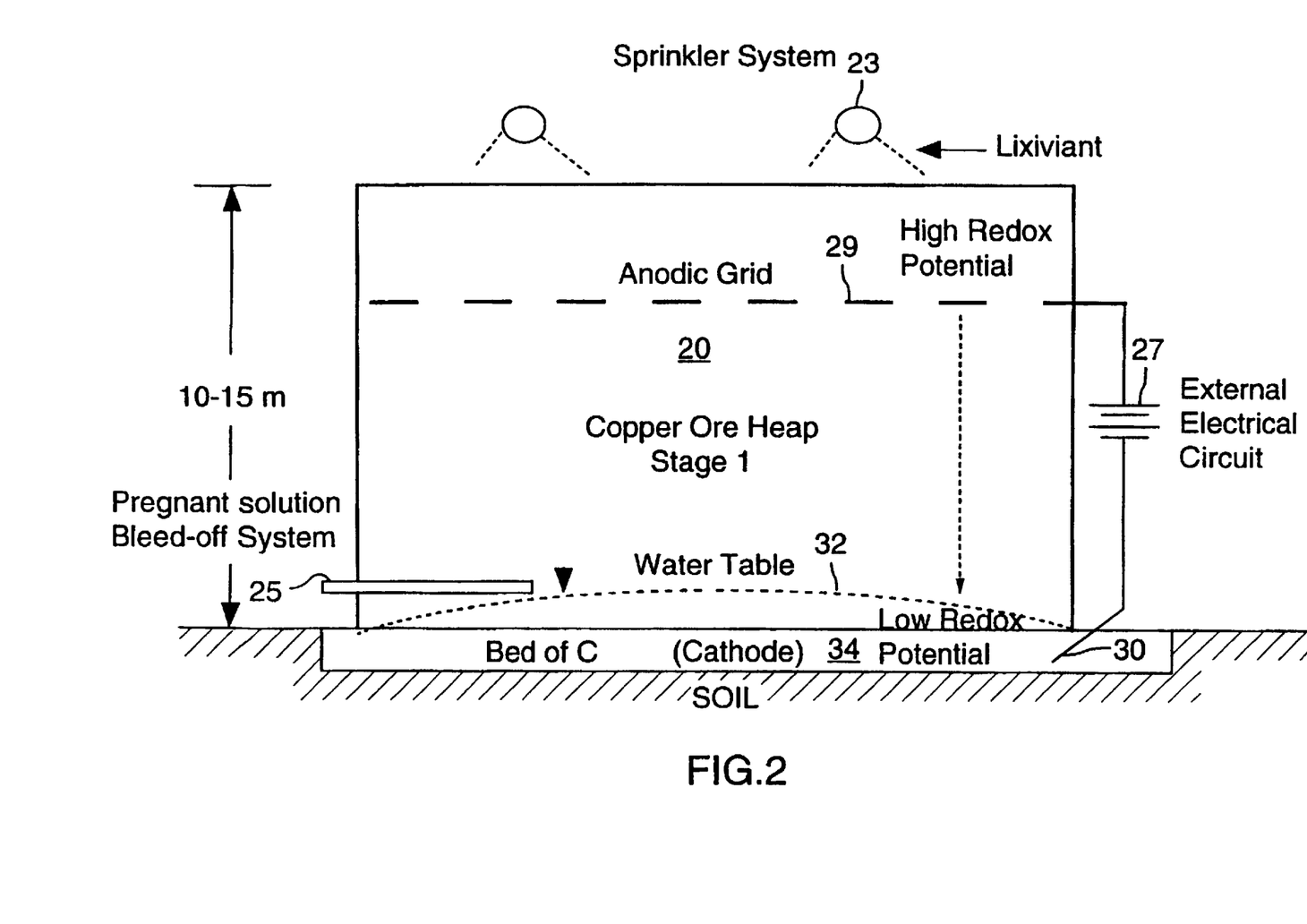
FIG. 2 is a cross-section of an ore-body comprising low-grade copper sulphide ore, arranged as an electrolytic cell.

FIG. 2 shows a typical heap 20 of copper sulphide ore. The heap 20 contains millions of tons of ore, and the ore is piled up into a heap dozens of meters high. Copper sulphide ore usually does include iron sulphides, and might also include oxides of copper, and other minerals of (many) other metals.

A sprinkler system 23 delivers appropriate acid lixiviant to the top of the heap 20. The system includes conventional means for varying the pH of the lixiviant, i.e by adding more or less acid.

A recovery or collection system 25 receives pregnant liquor for delivery to an electro-winning facility, or other facility for extracting dissolved copper from solution.

An external power source 27 is wired to the top and to the bottom of the heap 20, the imposed voltage creating an anode 29 at the top and a cathode 30 at the bottom. It will be understood that, in considering the extraction of copper, the anode creates in the lixiviant a zone of higher redox potential at the top of the heap, and the cathode creates a zone of lower redox potential at the base of the heap.

The dotted line 32 represents the water table in the heap 20.

In FIG. 2, the cathode electrode is comprised by a layer of an electrically-conductive material graphite 34. The layer is of such density and configuration that the layer as a whole is in a state of electrical-connectedness, whereby the whole layer is at a substantially uniform voltage. Of course, differences in voltage across the layer will be measurable in a practical case but that does not matter provided the layer is arranged so that the voltage variations over the cathode layer are not such as to affect the status of the electrolytic cell.

Figure 3:
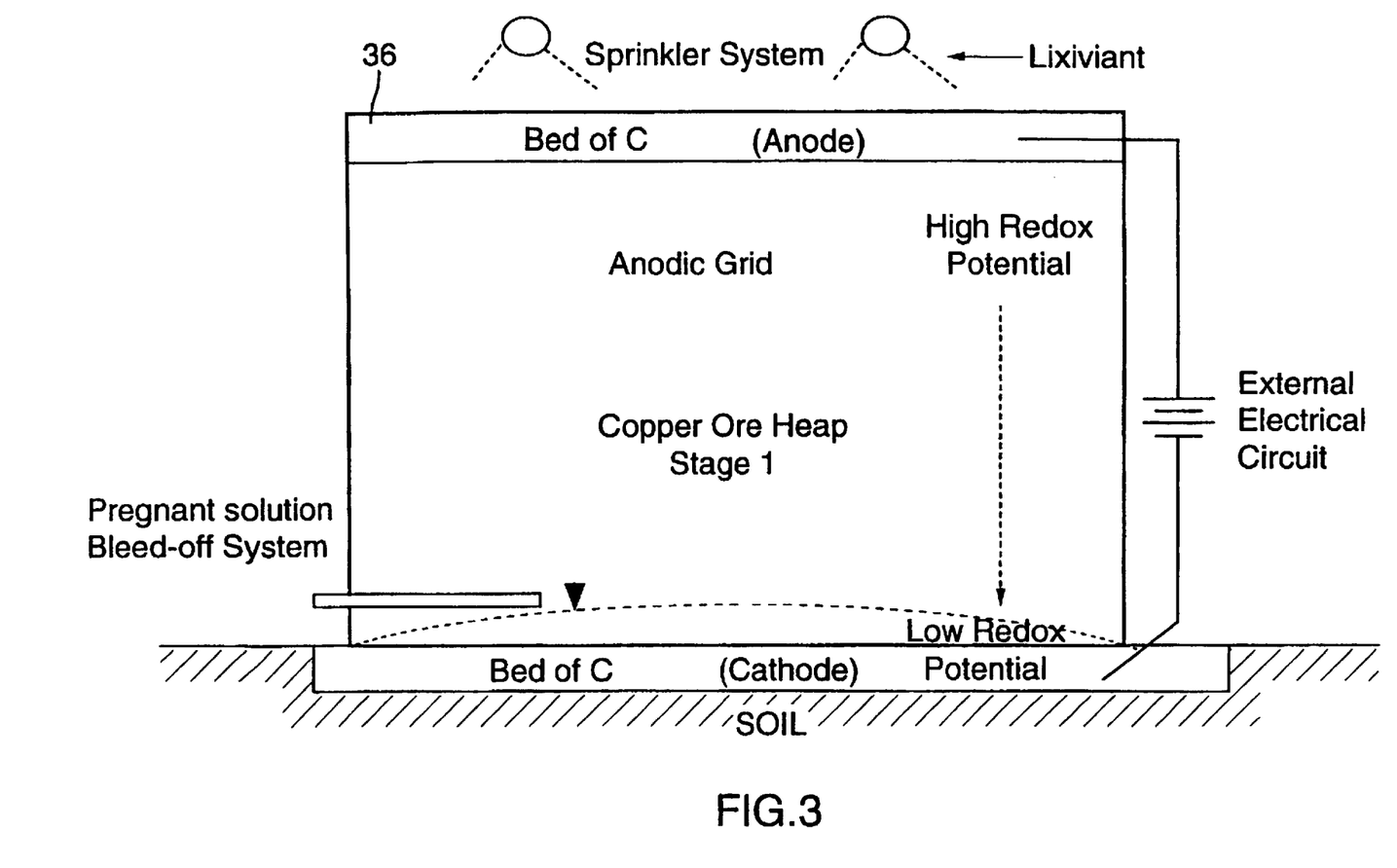
FIG. 3 is a cross-section of another ore-body, showing a different construction of the anode.

FIG. 3 is an alternative embodiment, in which a second layer of graphite 36 is placed at the top of the heap to act as anode.

Figure 4:
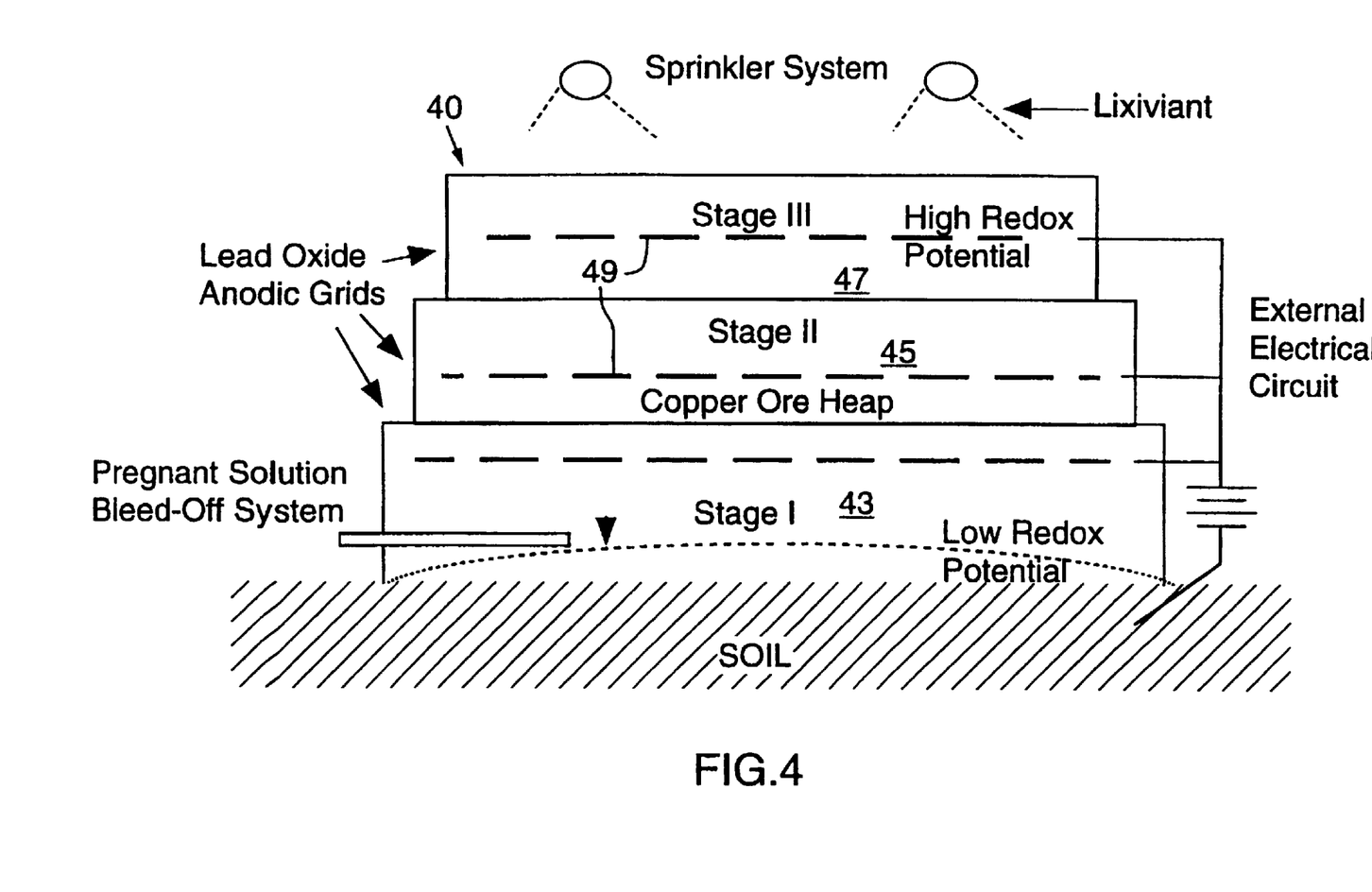
FIG. 4 is a cross-section of another ore-body, showing a progressive build-up of same.

In FIG. 4, the ore-bed 40 is built up in a number of stages (over a number of years). As the first (lower) stage 43 is worked out, more ore is piled above, as at 45 and 47, and more anode electrodes 49 are added in.

It is stressed that the anode electrode system should be extensive. As pointed out, the designer preferably should arrange that as much as possible of the heap of ore is an anode, i.e is under anodic conditions of high-Eh and low-pH.

Thus, when the anode electrode comprises metal conductors, these should be arranged as a grid or network, so as to extend through a large proportion of the heap. The metal conductors should be of stainless steel, or some other non-sacrificial material. Steel rods coated with lead oxide may be used.

When the anode electrode comprises graphite, several layers of graphite may be provided, intercalated with layers of the ore. The designer should see to it that as much as possible of the heap is under anodic conditions, whereby as much as possible of the heap is being urged to yield its copper.

Once a (lower) portion of the heap has yielded its copper, however, it is no longer necessary to connect that portion into the anode. That "dead" portion may remain in the cell, however, So long as it remains permeable to the flow of electrolyte. In fact, the dead portion can be useful in providing an intermediate buffer area between the anode and the cathode.

It should be noted that the electrolyte (lixiviant) passes down through the heap, which helps in transferring and spreading the anodic conditions over a large proportion of the heap. The cathodic conditions, on the other hand, are inhibited from spreading (e.g by diffusion) by the fact that the electrolyte is moving towards the cathode.

The heap of ore may be configured right from the start as an electrolytic cell. Alternatively, the heap of ore may be pre-existing, and the designers task of configuring the heap as an electrolytic cell is then more difficult. Introducing the anode and cathode electrodes can be problematic. The upper, high-redox, part of the heap becomes the anode, and the lower, low-redox, part of the heap the cathode. Whether or not the electrolysis system as described herein can be used to extract copper from an already-existing heap depends mainly on whether the electrical connections can be made into the different points in the heap.

Inserting a series of conductors into an already-existing heap can be difficult, but it is not by any means impossible. For example, rods of stainless steel can be inserted into prepared holes in the appropriate locations in the heap. Copper sulphide is electrically conductive to the extent that it will sometimes be possible to place the conductors close enough together that an effectively large zone can be engineered throughout which the required anodic conditions prevail; and if so, the system can be used.

In a case where the heap is engineered from the beginning in accordance with the need to constitute the heap as an electrolytic cell, as described herein, the cathode electrode can be provided as a grid or network of metal (e.g stainless steel) electrodes, which are laid down in the first-to-be-placed or bottom-most regions of the heap.

Figure 5:
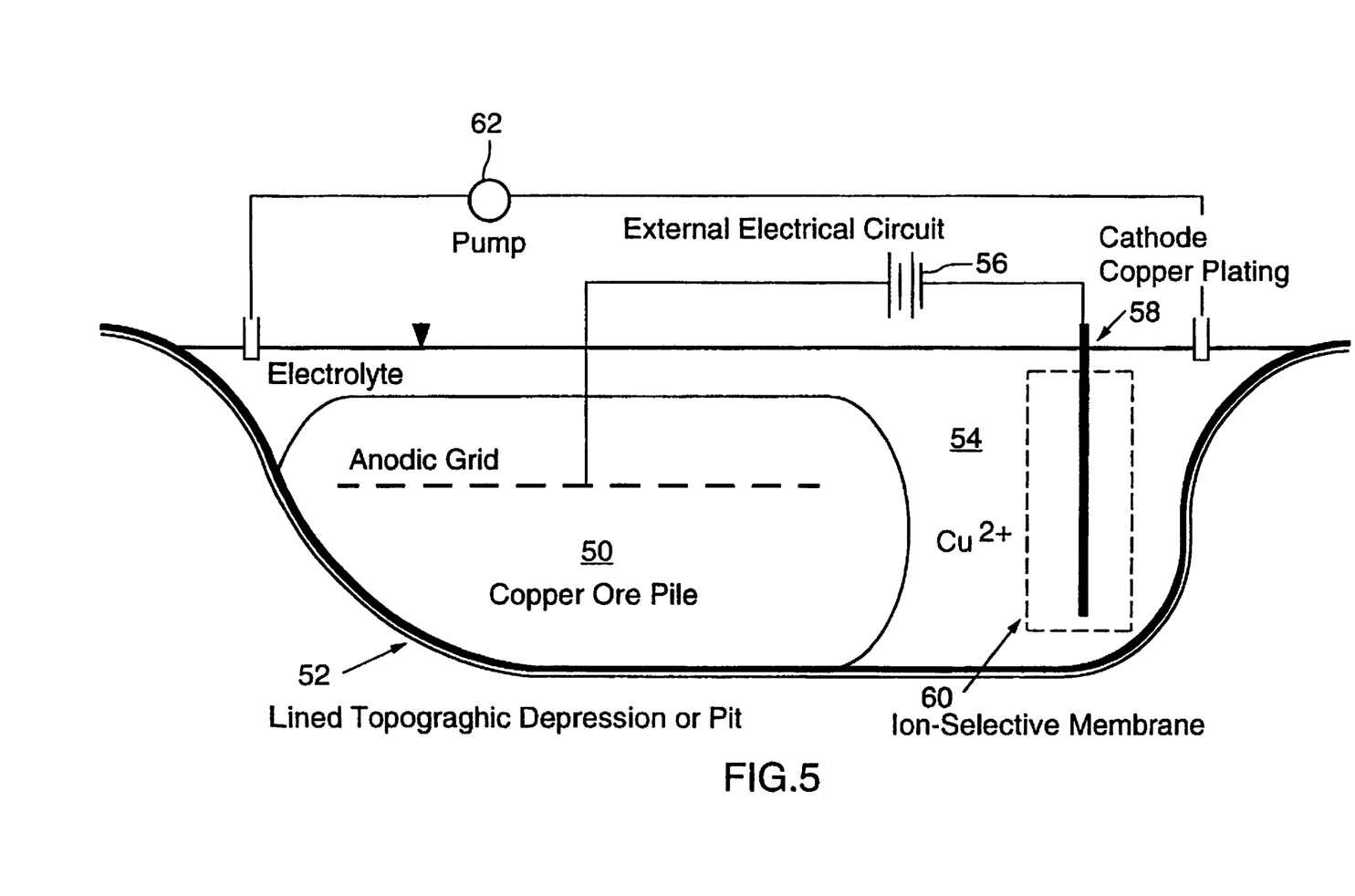
FIG. 5 is a cross-section of an ore-body located in a flooded pit, arranged as an electrolytic cell.

FIG. 5 illustrates an embodiment of the invention in which the mass 50 of ore, or it might be an ore body itself, is situated in a pit or topographic depression 52. In this embodiment, the pit 52 is flooded with an appropriate electrolyte 54 and the ore body 50 is wired as anode to an external power source 56. The cathode 58 is within the pit, and in the electrolyte 54. The cathode itself is surrounded by an ion-selective membrane 60, through which copper can pass. The copper precipitates on the cathode. The cathode should be kept submerged, to keep its pH low.

A pump 62 keeps the electrolyte in motion, moving from the anode to the cathode, The connection at the anode (i.e the ore body 50) may be directly to the ore itself, or to an embedded lead-oxide-coated steel grid, as previously described.

If there are other useful metals in the ore, it is sometimes possible to promote the selective recovery of the different metals. Thus, several anode/cathode pairings can be set up, and the imposed voltage can be modulated, whereby each anode/cathode pair receives an imposed voltage appropriate to the Eh-pH conditions necessary for the recovery of the particular metal.

In the invention, by impressing the electrical energy from outside the cell, the solution is caused to become the electrolyte of the cell. The cell promotes, at the anode therof, conditions in the electrolyte which enable the ready breakdown of the sulphide, and the dissolution of the copper. The anode reaction is the one that leads to the break-down of the sulphide, and puts the copper in solution, and the designer should seek to get as much as possible of the electrolyte in the heap to be anodic. Extensive anode grids at different levels of the heap promote the augmentation of the anodic conditions.

The designer should also note that, if other minerals are present, the dissolution of the copper can be spoilt, and careful reference to the appropriate Pourbaix diagram for whatever elements are encountered, is indicated.

It might be considered that an electrolytic cell of the kind as described herein might arise in nature. However, that is most unlikely. There is not sufficient conductivity in a low-grade ore to cause a meaningful anode and cathode situation to arise. For that, conductors are needed, and an outside source of energy imposes an anode/cathode situation from outside. In the system as described, so much more of the heap can be placed under the correct redox/pH conditions in which copper goes readily into solution, than before, that copper recovery rates can be increased several fold.

It has been recognised, in the invention, that it is practically and economically possible to transform a heap of ore into an electrolytic cell; that it is possible to engineer the redox-pH at the anode so that sulphide breaks down and copper goes into solution; and that it is possible to extract the copper metal, either by drawing-off the electrolyte with the copper dissolved in it, or by allowing the copper to plate out on the cathode. It is also recognised that it is possible to recover the copper without interference from the other substances, such as iron, that are usually present in copper ores.

What is claimed is:

1. Apparatus for extracting metal from an ore-body containing a low-grade mineral of the metal, wherein:
   the apparatus includes an anode-electrode and a cathode-electrode;
   the apparatus includes a liquid electrolyte;
   the electrolyte is so disposed as to provide electrolytic continuity between the anode-electrode and the cathode-electrode;
   the apparatus includes an electrical-connecting-means, which is connected between the anode-electrode and the cathode-electrode;
   the apparatus includes an electrical-energy-supply-means;
   the electrical-energy-supply-means is operatively positioned in the connecting-means so as to impose a voltage difference between the anode-electrode and the cathode-electrode;
   the anode-electrode is located in an anode-zone of the electrolyte;
   the cathode-electrode is located in a cathode-zone of the electrolyte;
   the ore-body is located in the electrolyte, and an anode-portion of the ore body is located in the anode-zone of the electrolyte;
   and the apparatus includes a means for recovering dissolved metal from the electrolyte; characterised in that:
   the apparatus includes a pH-measuring-means, for measuring the pH of the electrolyte in the anode zone and for measuring the pH of the electrolyte in the cathode zone;
   the apparatus includes an Eh-measuring-means, for measuring the Eh voltage of the electrolyte in the anode zone and for measuring the Eh voltage of the electrolyte in the cathode zone;
   the apparatus includes an operable Eh-adjusting-means, which is effective, when operated, to adjust the Eh voltage of the electrolyte in the anode zone and in the cathode zone;
   the Eh-adjusting-means comprises an operable means for adjusting the electrical-energy-supply-means;
   the Eh-adjusting-means is responsive to the as-measured levels of Eh and pH, and is effective to operate the means for adjusting the electrical-energy-supply-means, and to operate the said means until the Eh/pH conditions in the electrolyte in the anode zone are such that the predominant form of the metal in the anode zone is a dissolved-metal form;
   whereby ions of the metal, if present in the anode zone, are urged to enter solution in the electrolyte.

2. Apparatus of claim 1, wherein:
   the Eh-adjusting-means is effective to operate the said means until the Eh/pH conditions in the electrolyte in the cathode zone are such that the predominant form of the metal in the cathode zone is the solid metal form;
   whereby ions of the metal, if present in the cathode zone, are urged to precipitate out of solution, in the form of solid metal.

3. Apparatus of claim 2, wherein:
   the electrolyte includes a recovery-zone thereof;
   the apparatus includes a means for imposing a volumetric flow upon the liquid electrolyte, the flow being in a direction away from the anode-zone and towards and into the recovery-zone of the electrolyte;
   whereby liquid electrolyte laden with the dissolved metal passes from the anode-zone to the recovery-zone;
   and the apparatus includes a means for transferring metal-laden liquid from the recovery zone to the means for recovering the dissolved metal.

4. Apparatus of claim 3, wherein:
   the imposed flow is towards the cathode-zone of the electrolyte;
   the recovery-zone is so located that the liquid electrolyte, in passing from the anode-zone towards the cathode-zone, passes through the recovery-zone;
   and the means for recovering the dissolved metal includes a means for intercepting the metal-laden electrolyte in the recovery-zone before it reaches the cathode-zone.

5. Apparatus of claim 3, wherein:
   the imposed flow is towards the cathode-zone of the electrolyte;
   the recovery-zone and the cathode-zone coincide;
   whereby the metal-laden electrolyte reaches the cathode-zone, and the metal precipitates;
   and the means for recovering the dissolved metal includes a means for physically extracting and recovering the precipitated metal from the cathode-zone.

6. Apparatus of claim 3, wherein the means for imposing flow comprises a configuration of the ore-body in which flow takes place through the ore-body, naturally by gravity.

7. Apparatus of claim 3, wherein the means for imposing flow comprises a powered pump.

8. Apparatus of claim 2, wherein the cathode-zone of the electrolyte is located substantially outside the ore-body, and substantially all the ore-body lies within the anode-zone of the electrolyte.

9. Apparatus of claim 2, wherein:
   a cathode-portion of the ore-body is the portion of the ore-body that is located in the cathode-zone of the electrolyte, and an anode-portion of the ore-body is the portion of the ore-body that is located in the anode-zone of the electrolyte;

the mass of the metal contained in the anode-portion of the ore-body is substantially greater than the mass of the metal contained in the cathode-portion of the ore-body.

10. Apparatus of claim 2, wherein the apparatus includes an anode-augmentation-means, which is effective, in operation, to extend the said Eh-pH conditions that define the anode-zone through a substantial proportion of the electrolyte, and to thereby augment the anode-zone of the electrolyte.

11. Apparatus of claim 10, wherein: the anode-augmentation-means comprises many conductors arranged as a grid or grids within the anode-portion of the ore-body;

the conductors are electrically-connected together so as to be all at substantially the same voltage as the anode-electrode;

whereby zones of the electrolyte near the conductors acquire the said Eh-pH conditions of the anode-zone, and whereby portions of the ore-body in those zones become included within the anode-portion of the ore-body;

and the extent of the grid of conductors is such that the portion of the ore-body designated as the anode-portion thereof is a major proportion of the ore-body.

12. Apparatus of claim 10, wherein: the anode-augmentation-means comprises electrolyte-permeable porous material arranged as a layer located in or on the ore-body, termed the anode-layer;

the material of the layer is electrically conductive, in the sense that the layer is substantially more conductive than the ore-body;

the anode-layer is coherent in the electrically-conductive sense, to the extent that the anode-layer is at substantially the same voltage throughout as the anode-electrode.

13. Apparatus of claim 12, wherein the anode-augmentation means includes two or more of the said anode-layers, arranged in vertical intercalation with layers of the ore-body.

14. Apparatus of claim 2, wherein substantially all of the ore-body, including the anode-portion thereof, is submerged under the liquid electrolyte.

15. Apparatus of claim 2, wherein:

a cathode-portion of the ore-body lies completely submerged under the electrolyte;

the apparatus includes sprinkler-means, for applying the liquid electrolyte on top of the ore-body;

and the arrangement of the sprinkler means is such that an anode-portion of the ore-body is thoroughly wetted by sprinkled-on liquid electrolyte, but is not completely submerged, and the anode-portion of the ore-body is at least partially open to the atmosphere.

16. Apparatus of claim 2, wherein the apparatus includes means for cycling and recycling the liquid electrolyte, after metal has been removed therefrom, back through the ore-body.

17. Apparatus of claim 2, wherein:

the mineral in the ore-body includes copper and iron species;

the as-measured Eh in the electrolyte at the anode-electrode is Eh-anode-electrode, and the as-measured pH of the electrolyte at the anode-electrode is pH-anode-electrode;

and the magnitude of the imposed voltage, and the acidity of the electrolyte, are such that, when the point defined by Eh-anode-electrode and pH-anode-electrode is entered on the Cu—Fe—S—O—H Pourbaix diagram attached hereto as FIG. 1a, the point lies above and to the left of the line Q-Q'-Q" in that diagram.

18. Apparatus of claim 2, wherein:

the electrolyte includes a recovery-zone thereof;

the apparatus includes a means for imposing a volumetric flow upon the liquid electrolyte, the flow being in a direction away from the anode-zone and towards and into the recovery-zone of the electrolyte;

whereby liquid electrolyte laden with the dissolved metal passes from the anode-zone to the recovery-zone;

the imposed flow is towards the cathode-zone of the electrolyte;

the recovery-zone is so located that the liquid electrolyte, in passing from the anode-zone towards the cathode-zone, passes through the recovery-zone;

and the means for recovering the dissolved metal includes a means for intercepting the metal-laden electrolyte in the recovery-zone before it reaches the cathode-zone;

the means for imposing flow comprises a configuration of the ore-body in which flow takes place through the ore-body, naturally by gravity;

a cathode-portion of the ore-body is the portion of the ore-body that is located in the cathode-zone of the electrolyte, and an anode-portion of the ore-body is the portion of the ore-body that is located in the anode-zone of the electrolyte;

the mass of the metal contained in the anode-portion of the ore-body is substantially greater than the mass of the metal contained in the cathode-portion of the ore-body;

the apparatus includes an anode-augmentation-means, which is effective, in operation, to extend the said Eh-pH conditions that define the anode-zone through a substantial proportion of the electrolyte, and to thereby augment the anode-zone of the electrolyte;

a cathode-portion of the ore-body lies completely submerged under the electrolyte;

the apparatus includes sprinkler-means, for applying the liquid electrolyte on top of the ore-body;

and the arrangement of the sprinkler means is such that an anode-portion of the ore-body is thoroughly wetted by sprinkled-on liquid electrolyte, but is not completely submerged, and the anode-portion of the ore-body is at least partially open to the atmosphere.

19. Apparatus of claim 2, wherein:

the electrolyte includes a recovery-zone thereof;

the apparatus includes a means for imposing a volumetric flow upon the liquid electrolyte, the flow being in a direction away from the anode-zone and towards and into the recovery-zone of the electrolyte;

whereby liquid electrolyte laden with the dissolved metal passes from the anode-zone to the recovery-zone;

the imposed flow is towards the cathode-zone of the electrolyte;

the recovery-zone is so located that the liquid electrolyte, in passing from the anode-zone towards the cathode-zone, passes through the recovery-zone;

the means for recovering the dissolved metal includes a means for intercepting the metal-laden electrolyte in the recovery-zone before it reaches the cathode-zone;

the imposed flow is towards the cathode-zone of the electrolyte;

the recovery-zone and the cathode-zone coincide;

whereby the metal-laden electrolyte reaches the cathode-zone, and the metal precipitates;

the means for recovering the dissolved metal includes a means for physically extracting and recovering the precipitated metal from the cathode-zone;

the cathode-zone of the electrolyte is located substantially outside the ore-body, and substantially all the ore-body lies within the anode-zone of the electrolyte;

the means for imposing flow comprises a powered pump;

and substantially all of the ore-body, including the anode-portion thereof, is submerged under the liquid electrolyte.

20. Apparatus of claim 1, wherein the mineral is a sulphide of the metal.

21. Apparatus of claim 1, wherein the metal is copper.

22. Procedure for extracting metal from an ore body containing a low-grade mineral of the metal, comprising the following steps:

providing an anode-electrode and a cathode-electrode, and a liquid electrolyte;

the electrolyte is so disposed as to provide electrolytic continuity between the anode-electrode and the cathode-electrode;

providing an electrical-connecting-means, which is connected between the anode-electrode and the cathode-electrode;

providing an electrical-energy-supply-means, which is operatively positioned in the connecting-means so as to impose a voltage difference between the anode-electrode and the cathode-electrode;

locating the anode-electrode in an anode-zone of the electrolyte;

locating the cathode-electrode in a cathode-zone of the electrolyte;

locating the ore-body in the electrolyte, an anode-portion of the ore body being located in the anode-zone of the electrolyte;

providing a means for recovering dissolved metal from the electrolyte; characterised by:

measuring the pH of the electrolyte in the anode zone and the pH of the electrolyte in the cathode zone;

measuring the Eh voltage of the electrolyte in the anode zone and the Eh voltage of the electrolyte in the cathode zone;

providing an operable Eh-adjusting-means, which is effective, when operated, to adjust the Eh voltage of the electrolyte in the anode zone and in the cathode zone;

the Eh-adjusting-means comprises an operable means for adjusting the electrical-energy-supply-means;

adjusting the Eh/pH-adjusting-means, in response to the measurements of Eh and pH, by operating the means for adjusting the electrical-energy-supply-means, and operating the said means until the Eh/pH conditions in the electrolyte in the anode zone are such that the predominant form of the metal in the anode zone is a dissolved form;

whereby ions of the metal, if present in the anode zone, are urged to enter solution in the electrolyte.

* * * * *